Feb. 18, 1936.   O. KERNSPECHT   2,031,217
GUARD FOR AUTOMOTIVE VEHICLE BUMPERS
Filed May 15, 1934
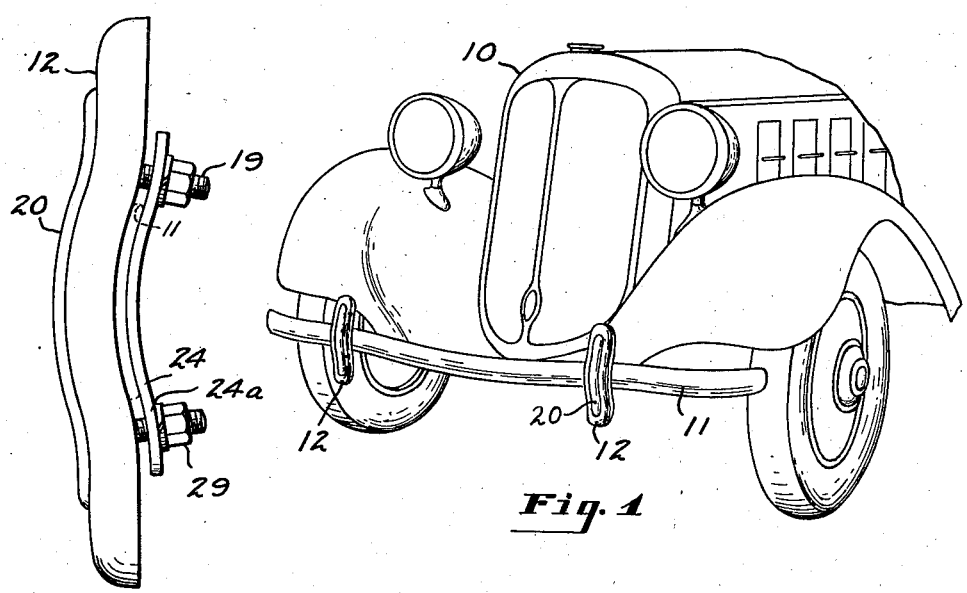
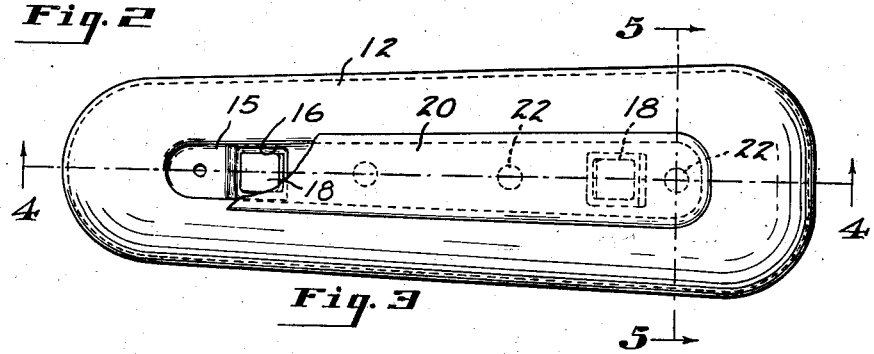
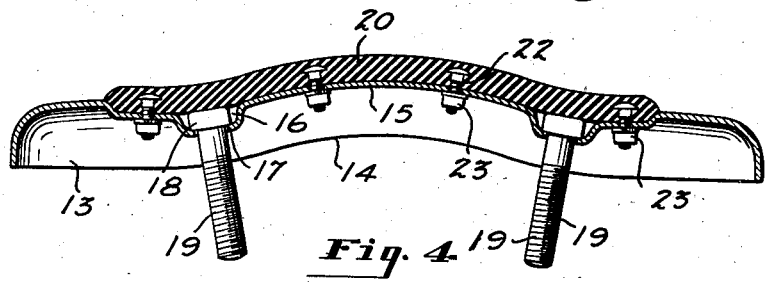
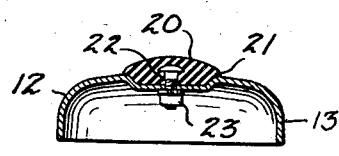
INVENTOR
*Otto Kernspecht*
BY
*Evans + McCoy*
HIS ATTORNEYS Patented Feb. 18, 1936

2,031,217

UNITED STATES PATENT OFFICE 2,031,217

GUARD FOR AUTOMOTIVE VEHICLE BUMPERS

Otto Kernspecht, Cleveland, Ohio, assignor to Variety Machine & Stamping Company, Cleveland, Ohio, a corporation Application May 15, 1934, Serial No. 725,701

3 Claims. (Cl. 293—55)

This invention relates to bumpers for motor vehicles and more particularly to guards therefor.

It is well known that frequently a driver of a motor vehicle, in order to obtain sufficient space to get out of a parking space parallel to a curb, will push the car ahead of or back of him with the bumper of his car. This engagement of the bumper of the one car with the bumper of the other car frequently mars or scratches the finish of the bumpers to such an extent that the nickel or chromium plating thereof is removed, leaving a portion of the bare metal of the bumper bar exposed and subject to rust.

The primary object of the present invention is to minimize, so far as possible, the scratching or marring of the bumper surfaces.

Another object is to provide a bumper with a plurality of vertically arranged guards, each of which is provided with projecting non-metallic portions which prevent the marring or scratching of the finished surface of the bumper and bumper guard when the same are engaged with corresponding portions of another motor vehicle.

With the above and other objects in view the present invention consists of certain features of construction and combinations of parts to be hereinafter described with reference to the accompanying drawing and then claimed.

In the drawing, which illustrates a suitable embodiment of the invention,

Figure 1 is a perspective view of the front end of a motor vehicle, showing guards of the present invention attached to the front bumper thereof;

Fig. 2 is a side elevation of the bumper guard;

Fig. 3 is a front elevation of the bumper guard shown in Fig. 2, a portion of the non-metallic member being removed;

Fig. 4 is a longitudinal section taken approximately on the line 4—4 of Fig. 3; and Fig. 5 is a transverse section taken approximately on the line 5—5 of Fig. 4.

Referring to the accompanying drawing, in which like numerals refer to like parts throughout the several views, I have shown for illustration in Fig. 1 a motor vehicle 10 having a front bumper 11 thereon. While I have shown the invention in association with the front bumper of the motor vehicle, it is to be understood that the same is applicable also to the rear bumper.

The present invention resides in a plurality of vertically arranged bumper guards 12 secured in any suitable manner to a bumper, preferably two or more guards being employed for each bumper. Each guard 12 is preferably in the form of a generally rectangular shaped member, stamped or otherwise formed from metal of suitable thickness. The guard 12 shown in the drawing is of the stamped metal type so as to provide the body portion of the guard with a marginal reinforcing flange 13 which is preferably indented at 14 at each side to form a bumper engaging surface.

The surface of the body portion of the guard is formed with a centrally located, longitudinally extending depression 15, the bottom of which is further depressed and apertured at spaced regions to provide bolt receiving depressions 16 and bolt openings 17. The depressions 16 receive the heads 18 of suitable bolts 19, the bolts extending through the openings 17 as shown in Fig. 4.

Mounted within the longitudinal depression 15 is a non-metallic strip 20 preferably of a resilient material such as rubber, and which is of such cross-sectional shape as to fill the depression 15 and to project beyond the surface of the body portion of the guard 12 as shown in Fig. 5. Preferably the strip 20 is formed with a marginal shoulder 21 which overlies the edge of the depression 15.

In the embodiment shown in the drawing the non-metallic member 20 is secured to the body portion of the guard 12 by means of bolts 22, the heads of which are imbedded in the member 20 and the threaded portions of which extend through the guard and are provided with securing nuts 23. Obviously, however, other methods may be employed to secure the non-metallic member 20 to the body portion of the guard. One such method is to vulcanize the non-metallic strip 20, in the case where the strip is formed of rubber, to the bottom of the depression 15. It will be noted in Figs. 3, 4 and 5 that the non-metallic strip 20 completely fills the depression 15 and conceals the bolt heads 18.

The external surface of the non-metallic member 20 is shown in the drawing to be of arcuate contour, but it is to be understood that the same may be configured in any other suitable manner.

The guard 12 is secured to the bumper in a vertical position by means of a clamping plate 24 having elongated openings 24a therein through which the bolts 19 extend, nuts 29 being threaded on the bolts 19 to clamp the bumper bar between the continuous flange 13 of the guard and the clamping plate 24, thus providing a means for removably securing the guard to the bumper.

If desired, other suitable means may be provided for carrying the securing bolts 19 and also other suitable means may be provided for securing the guard to the bumper.

It is thus seen that by providing bumper guards with a projecting strip of non-metallic material such as rubber, the chromium or nickel finished surfaces of both the guards and the bumpers will be protected from engagement with the bumper of another vehicle, so as to minimize the danger of scratching or marring these surfaces. The guards 12, which project above and below the bumper, also tend to prevent locking of the bumpers of the two vehicles should one bumper be higher or lower than the other.

Although a single embodiment of the invention has been herein shown and described it will be understood that numerous details of the construction shown may be altered or omitted without departing from the spirit of this invention as defined in the following claims.

What I claim is:

1. A guard for vehicle bumpers comprising a stamped metal member having a continuous, marginal, bumper engaging flange, said member having a centrally disposed laterally offset portion lying within said continuous flange in spaced relation and forming a depression in the face of said member, and a non-metallic member secured to said offset portion and filling said depression, said non-metallic member being of greater depth than said depression, whereby to project outwardly from the face of said stamped metal member.

2. A guard for vehicle bumpers comprising a stamped metal member having a continuous, marginal, bumper engaging flange, said member having a centrally disposed laterally offset portion lying within said continuous flange in spaced relation and forming a depression in the face of said member, and a non-metallic member secured to said offset portion and filling said depression, said non-metallic member being of greater depth than said depression, whereby to project outwardly from the face of said stamped metal member, said non-metallic member having a marginal portion substantially overlapping said face of said metal member.

3. A guard for vehicle bumpers comprising a stamped metal member having a continuous, marginal, bumper engaging flange, said member having a centrally disposed laterally offset portion lying within said continuous flange in spaced relation and forming a depression in the face of said member, said offset portion having spaced depressions therein and provided with apertures, headed attachment bolts extending through said apertures and having their heads confined entirely within said depressions, and a non-metallic member secured to said offset portion and substantially completely filling said first mentioned depression and being of greater depth than said first mentioned depression, whereby to project outwardly from the face of said stamped metal member.

OTTO KERNSPECHT.